United States Patent [19]
Sakai

[11] Patent Number: 5,700,070
[45] Date of Patent: Dec. 23, 1997

[54] VEHICLE BRAKE CONTROL DEVICE

[75] Inventor: Koji Sakai, Hamakita, Japan

[73] Assignee: Nisshinbo Industries Inc., Tokyo, Japan

[21] Appl. No.: 514,296

[22] Filed: Aug. 11, 1995

[30] Foreign Application Priority Data

Aug. 16, 1994 [JP] Japan .................................. 6-214223

[51] Int. Cl.⁶ .................................................. B60T 8/32
[52] U.S. Cl. ........................................ 303/115.4; 303/900
[58] Field of Search .......................... 303/113.1, 113.2, 303/115.1, 115.4, 116.1, 116.2, 119.1, 64, 900, DIG. 1, DIG. 2

[56] References Cited

U.S. PATENT DOCUMENTS 5,004,301 4/1991 Yamada et al. .................. 303/115.4
5,195,809 3/1993 Burgdorf ..................... 303/115.4 X

*Primary Examiner*—Josie Ballato
*Attorney, Agent, or Firm*—Nikaido, Marmelstein, Murray & Oram LLP

[57] ABSTRACT

A vehicle brake control device is provided which effectively reduces the noise and pulsation, while securing a pressure boost during anti-skid control and traction control. The brake control device is comprised of a main brake line routed through the master cylinder 13, inlet valve 25, and the wheel cylinder 26, wherein an accumulator 24 to store the hydraulic pressure is installed in the brake line between the master cylinder 13 and wheel cylinder 26.

9 Claims, 5 Drawing Sheets

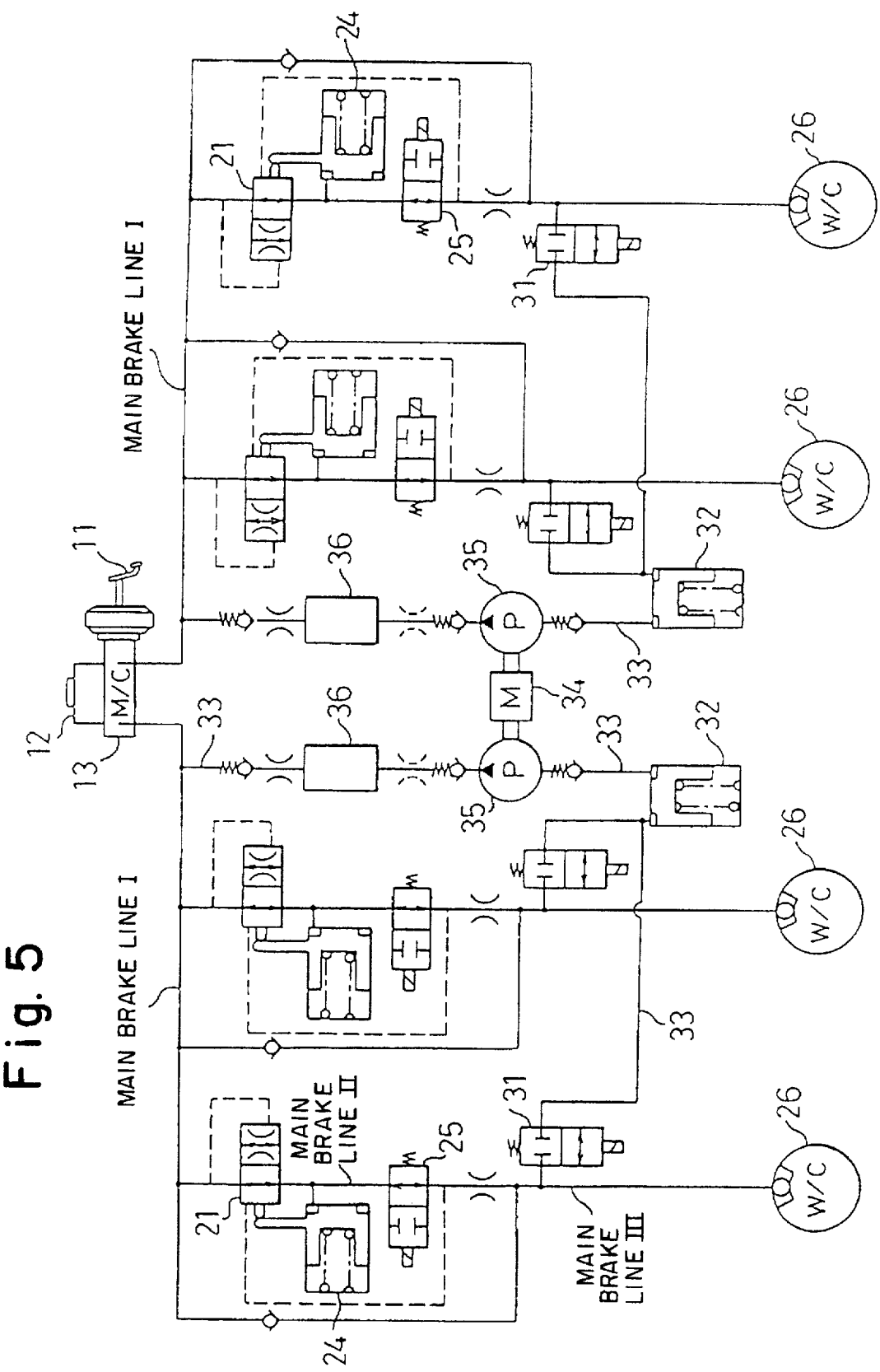

VEHICLE BRAKE CONTROL DEVICE

BACKGROUND OF THE INVENTION

This invention relates to a vehicle brake control device that provides anti-skid control (ABS), traction control (TCS), or both functions thereof.

In a conventional brake control device, a switching valve is positioned in front of or behind the inlet valve. During braking or during anti-skid control, operation is switched from the main brake line to a constricted line to prevent the generation of annoying noise or to reduce pulsation.

A conventional brake control device as described presents the following problems:

1. After switching from the main brake line to a constricted line with the switching valve, the amount of pressure boost attained is determined by the constriction of the switching valve, which makes it difficult to reduce noise and pulsation while maintaining good anti-skid control. For example, if in order to reduce noise, the switching valve is too constricted, then the pressure boost will not be sufficient for anti-skid control, particularly if the pressure differential between the master cylinder and the wheel cylinder is small. Conversely however, to ensure a sufficient pressure boost for anti-skid control, the switching valve would become too wide to adequately suppress noise and pulsation.

2. During traction control, there is a large variation in the pressure boost depending on whether the pump is in the discharge or suction state.

SUMMARY OBJECTIVES OF THE INVENTION

The objective of this invention is to achieve a good balance between reducing noise, pulsation and ensuring adequate pressure boost for braking control. Another objective of this invention is to improve pedal responsiveness during normal braking. A further objective is to ensure a stable pressure boost during traction control.

A vehicle brake control device is provided which effectively reduces the noise and pulsation, while securing a pressure boost during anti-skid control and traction control. The brake control device is comprised of a main brake line routed through the master cylinder, an inlet valve, and a wheel cylinder. An accumulator to store hydraulic pressure is installed in the main brake line between the master cylinder and the wheel cylinder.

This invention provides the following advantages:

1. During anti-skid or traction control, the main brain lines are severely constricted, such that virtually no noise or pressure pulsation is generated, and any pulsation that is generated is effectively dissipated by the accumulator and constrictions.

2. During anti-skid or traction control, although the main brake lines are severely constricted, the accumulator enables any pressure boost arising from the pulsing action of the inlet valve to be adjusted to a prescribed value, thus reducing noise and pulsation, while securing the pressure boost needed for optimum control.

3. During anti-skid or traction control, although there is very little pressure differential between the master cylinder and the wheel cylinders, since pressure accumulates inside the accumulator when the inlet valve is closed, good pressure boost can be obtained when the inlet valve opens. Should the pressure differential between the master cylinder and the wheel cylinders become even smaller, the switching valve remains in the same state, in which case the main brake lines are not constricted, and good pressure boost can be obtained with the inlet valve to ensure optimum control.

4. During traction control, since pressure can be accumulated inside the accumulator, a stable pressure boost can be obtained regardless of whether the pump is in the discharge or suction state.

BRIEF DESCRIPTION OF THE DRAWING

The above and other objects and the attendant advantages of the present invention will become readily apparent by reference to the following detailed description when considered in conjunction with the accompanying drawings wherein:

FIG. 5 is an explanatory diagram of the hydraulic pressure lines of the brake control device to be applied to all four wheels.

DETAILED DESCRIPTION OF THE INVENTION AND OF THE PREFERRED EMBODIMENTS

Figure 1:
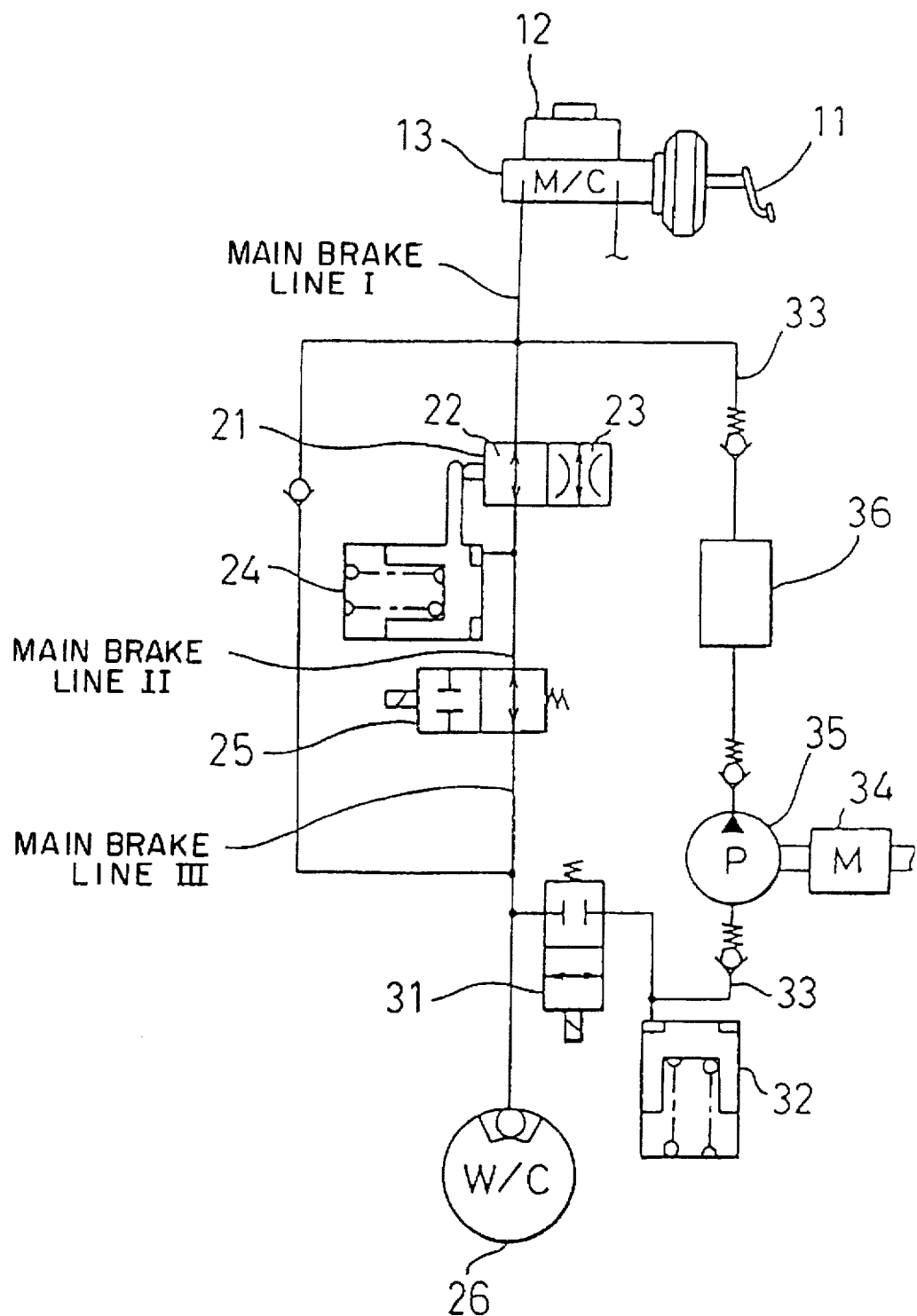
FIG. 1 is an explanatory diagram of the hydraulic pressure lines of the brake control device.

Working examples of the brake control device of this invention are explained below with reference to the diagrams.

1. Example I

In the brake control device, when the brake pedal 11 is pressed, brake fluid is supplied from the main reservoir 12, generating a brake pressure at the master cylinder 13, which is supplied through the main brake line I, switching valve 21, main brake line II, accumulator 24, inlet valve 25, and main brake line III to the wheel cylinder 26 of each wheel. The switching valve 21 switches between a non-constricted, open line 22 and a constricted, narrow line 23, and during normal braking allows passage through the open line 22. A restrictor can be used instead of the switching valve 21. The accumulator 24 has an extremely small capacity; for example, a maximum capacity so as not to lose pedal responsiveness, a capacity to vary the pressure of the wheel cylinder 26 by at most several atmospheres, or to enable integration with the inlet valve 25, and is at maximum 10% of the brake fluid consumption of brake line I, or at most 1 cc.

As shown in FIG. 1, during anti-skid control, the action of the inlet valve 25, outlet valve 31, and pump 35 exhausts the brake pressure from the wheel cylinder 26, through the main brake line III and outlet valve 31, to the auxiliary reservoir 32. The brake pressure is subsequently returned, through the pump (motor 34) 35, dumping chamber 36, and reflux line 33 to the main brake line I, and is supplied to each wheel cylinder 26 through the switching valve 21, main brake line II, accumulator 24, inlet valve 25, and main brake line III. The switching valve 21 is switched by the state of the accumulator 24; for example, if the hydraulic pressure of the accumulator is small, the switching valve 21 is maintained in the open line 22 state; if the hydraulic pressure of the accumulator is large, then the switching valve is maintained in the constricted line 23 state. This series of actions controls the slip of each wheel during braking to control skidding.

Figure 2:
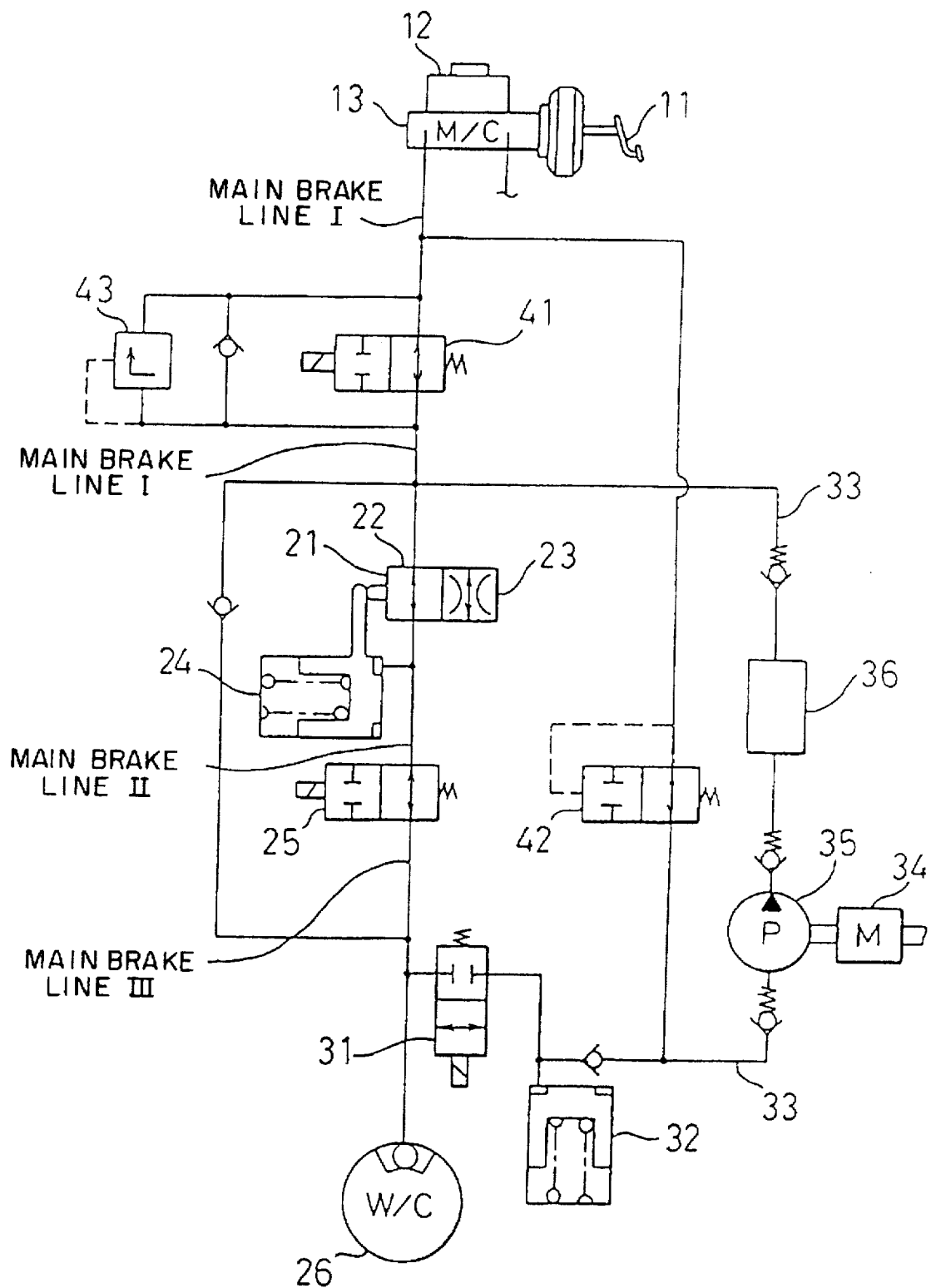
FIG. 2 is an explanatory diagram of the hydraulic pressure lines of a brake control device equipped with a TCS valve.

For traction control, as shown in FIG. 2, a TCS valve 41 is inserted between the master cylinder 13 and the point of intersection of the main brake line I and reflux line 33, and a M/C switching valve 42 is installed between the master cylinder 13 and the reflux line 33 on the inlet side of the pump 35. During traction control, TCS valve 41 is closed, and the pump 35 is activated to supply brake fluid from the main reservoir 12 through the M/C switching valve 42. Fluid is then further supplied through the dumping chamber 36 and reflux line 33 to the main brake line I, then through the switching valve 21, main brake line II, accumulator 24, inlet valve 25, and main brake line III to each wheel cylinder 26. This series of controls prevent excessive spinning of the drive wheels to provide traction control.

2. Alternate Configurations

Figure 3:
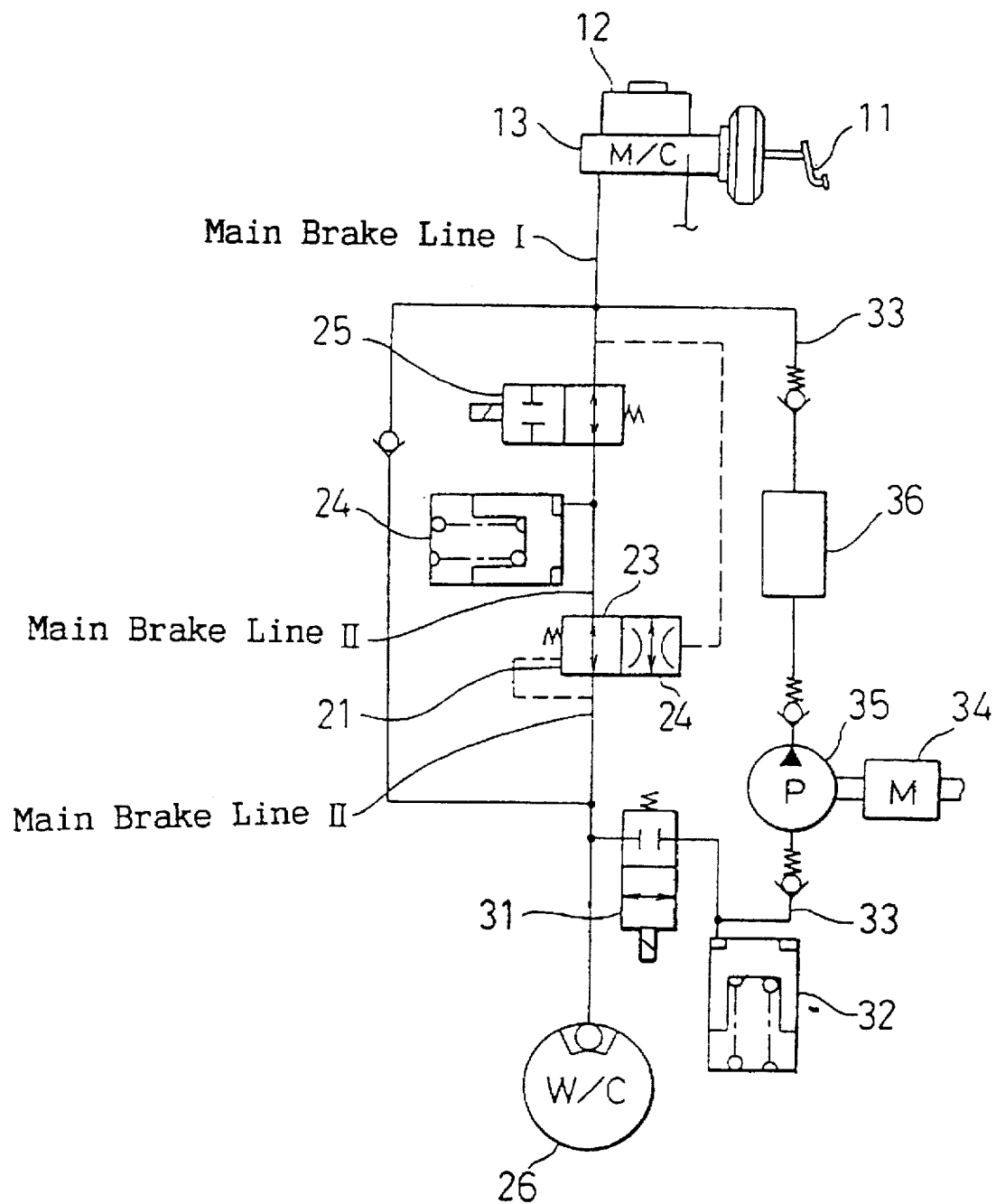
FIG. 3 is an explanatory diagram of the hydraulic pressure lines of a second configuration of the brake control device.

FIG. 3 illustrates another configuration of a brake control device in which the main difference from that of FIG. I is that the positions of the main inlet valve 25 and switching valve 21 have been switched. In the configuration of FIG. 3, the switching valve 21 is activated by the hydraulic pressure differential between the main brake line I and the main brake line III. If the two pressures are equal, the action of the spring force will leave the switching valve in its non-constricted state; but if the pressure differential becomes large enough to resist the spring force, then the valve switches to the constricted state.

Figure 4:
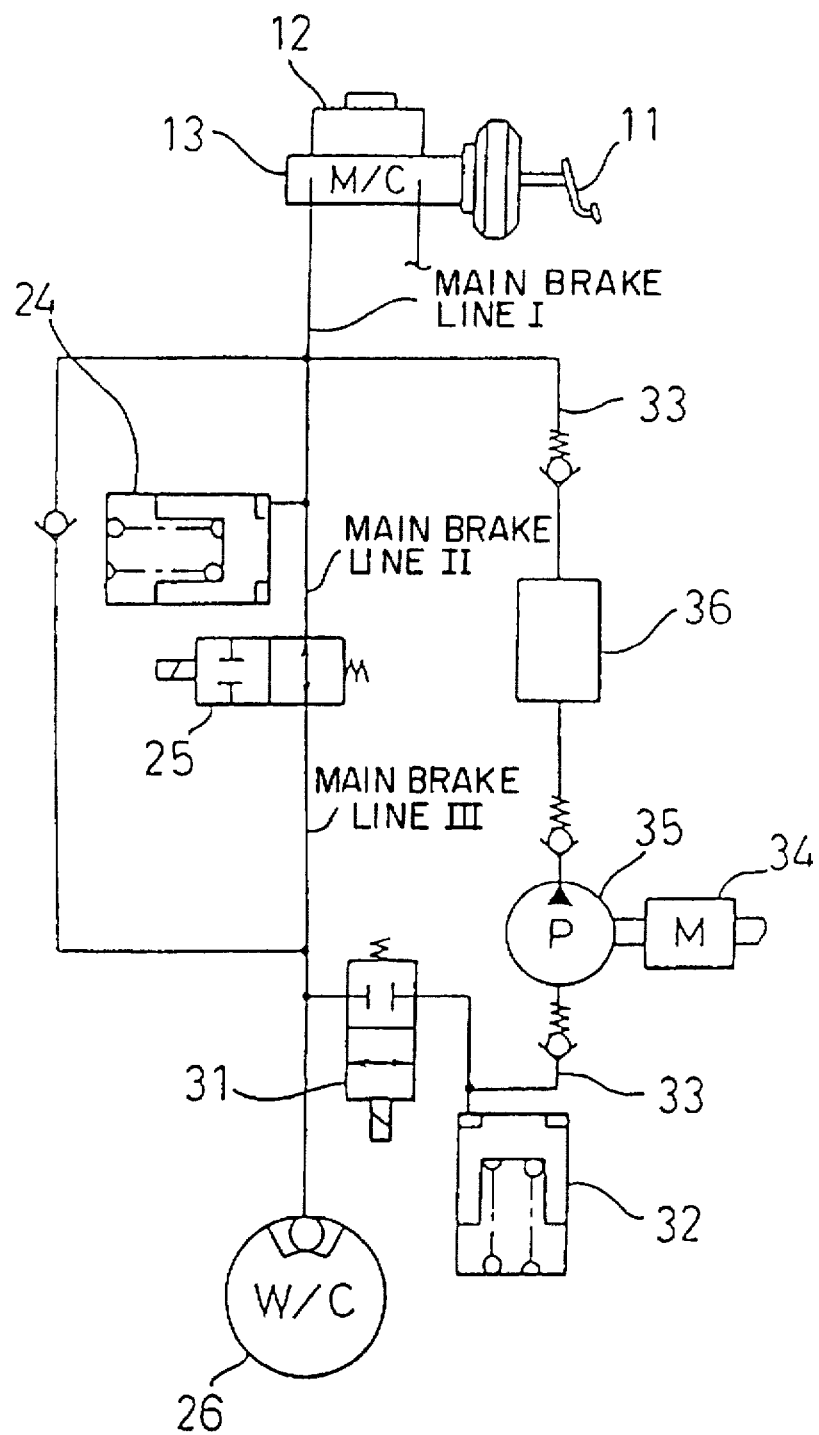
FIG. 4 is an explanatory diagram of the hydraulic pressure lines of a third configuration of the brake control device.

FIG. 4 illustrates a third configuration in which the switching valve 21 has been omitted from the configuration of FIG. 1 or FIG. 3. The circuit as shown in FIG. 2 that was added to the configuration of FIG. 1 is essential for traction control for the configurations of FIG. 3 or FIG. 4.

FIG. 5 illustrates yet another configuration in which the basic configuration of FIG. 1 is applied to all four wheels. As well, the switching valve 21 switches states when the accumulator 24 is full and the pressure differential between the main brake line I and main brake line III reaches a prescribed value.

3. Operation

The operation of the brake control device is explained below using the configuration of FIG. 1 in which the accumulator 24 and switching valve 21 are installed upstream of the inlet valve 25. During anti-skid control, if the inlet valve 25 is closed, brake fluid supplied from the master cylinder 13 is routed through the switching valve 21 and accumulates in the accumulator 24 up to a specified volume, at which point the switching valve 21 switches to the constricted line 23. Subsequently, as the inlet valve 25 opens, the brake fluid that had accumulated inside the accumulator 24 is supplied to the wheel cylinders 26 to brake the vehicle. In this case, since the switching valve 21 is in the narrow line 23, the constricted state, there will be no sudden flow from the master cylinder 13. Then, any pulsation generated as the inlet valve 25 closes again will be transmitted to the master cylinder 13 to a very minute degree, because of the effective dumping action of the accumulator 24 and the switching valve 21.

Next, the action of the brake control device during traction control is explained below using the configuration of FIG. 2 in which the accumulator 24 and switching valve 21 are positioned upstream of the inlet valve 25, and a TCS valve 41 is installed. During, traction control (TCS valve 41 is closed), since the switching valve 21 is in the non-constricted, open line 22 state, initially brake fluid will be transmitted to the accumulator 24 and wheel cylinder 26 at high speed. Then as the inlet valve 25 closes, brake fluid accumulates in the accumulator 24 until the pressure limiting valve (PLV) component 43 of TCS valve 41 is activated. Next, as the inlet valve 25 opens, brake fluid from the accumulator 24 is supplied to the wheel cylinders 26. This enables a steady pressure boost, even when the inlet valve 25 opens, regardless of whether the pump 35 is in the discharge or constriction state.

Next, the operation of the brake control device is explained using the configuration of FIG. 3 in which the accumulator 24 and switching valve 21 are positioned downstream of inlet valve 25. During anti-skid or traction control, if the inlet valve 25 is closed, the supply of brake fluid from the master cylinder 13 and pump 35 is interrupted, in which case, pressure from the accumulator 24 is supplied through the switching valve 21 to the wheel cylinders 26 to equalize the pressure. Subsequently, as the inlet valve 25 opens, brake fluid from the master cylinder 13 and pump 35 accumulates primarily inside the accumulator 24 and with the constriction of the switching valve 21 is supplied at reduced flow to the wheel cylinders 26 to brake the vehicle. If considerable fluid has accumulated inside the accumulator 24, since the switching valve 21 is in the constricted state, narrow line 23, the rate of fluid flow will be drastically reduced, in which case, virtually no pulsation will be generated until the inlet 25 closes. Pulsation will occur if the accumulator 24 is not filled completely, but the dumping efficacy of the accumulator and the switching valve 21 (or orifice) means that only extremely minute pulses will be transmitted to the wheel cylinders.

Finally, the operation of the brake control device will be explained below using the configuration of FIG. 4, in which the switching valve 21 is not used, and only the accumulator 24 is positioned upstream of the inlet valve 25. During anti-skid or traction control, if the inlet valve 25 is closed, brake fluid supplied from the master cylinder 13 is stored in the accumulator 24. Then, as the inlet valve 25 opens, brake fluid from the master cylinder 13 and that stored inside the accumulator 24 is supplied to the wheel cylinders 26 to brake the vehicle. Next, as the inlet valve 25 closes, any pulsation generated therein is dissipated inside the accumulator 24 and the tubing, such that only an extremely minute pulsation is transmitted to the master cylinder 13.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

We claim:

1. A vehicle brake control device used for anti-skid control or traction control, comprising:

a main brake line routed through a master cylinder;

an inlet valve; and a wheel cylinder;

wherein an accumulator for storing hydraulic pressure is installed in the main brake line between the master cylinder and the wheel cylinder, said accumulator being of an extremely small capacity which varies the brake pressure of the wheel cylinder by at most a few atmospheres.

2. A vehicle brake control device used for anti-skid control or traction control, comprising:

a main brake line routed through a master cylinder;

an inlet valve;

a wheel cylinder;

wherein a switching valve for switching between a non-constricted line and a constricted line, or a restrictor, is positioned in the main brake line between the master cylinder and the wheel cylinder; and an accumulator for storing hydraulic pressure is installed between the inlet valve and the switching valve or restrictor.

3. A vehicle brake control device as claimed in claim 2, wherein the accumulator is of an extremely small capacity which varies the brake pressure of the wheel cylinder by at most a few atmospheres.

4. A vehicle brake control device used for anti-skid control or traction control, comprising:

a main brake line routed through a master cylinder;

an inlet valve;

a wheel cylinder; and an accumulator means for adjusting a pressure boost arising from a pulsing action of the inlet valve to a prescribed value and for storing hydraulic pressure is installed in the main brake line between the master cylinder and the wheel cylinder, said accumulator means being of an extremely small capacity which varies the brake pressure of the wheel cylinder by at most a few atmospheres.

5. A vehicle brake control device used for anti-skid control or traction control, comprising:

a main brake line routed through a master cylinder;

an inlet valve;

a wheel cylinder;

wherein a switching valve for switching between a non-constricted line and a constricted line, or a restrictor, is positioned in the main brake line between the master cylinder and the wheel cylinder; and an accumulator means for adjusting a pressure boost arising from a pulsing action of the inlet valve to a prescribed value and for storing hydraulic pressure is installed between the inlet valve and the switching valve or restrictor.

6. A vehicle brake control device as claimed in claim 5, wherein the accumulator means is of an extremely small capacity which varies the brake pressure of the wheel cylinder by at most a few atmospheres.

7. A vehicle brake control system used for anti-skid control or traction control, in combination with a brake system, said brake system comprising:

a master cylinder, a wheel cylinder, a main brake line routed between said master cylinder and said wheel cylinder;

an inlet valve in said main brake line before said wheel cylinder, an outlet valve, a pump having a suction inlet connected to said outlet valve, and a reflux line routed from the wheel cylinder through said outlet valve and said pump arranged in parallel with the inlet valve, an outlet of the pump being connected to a master cylinder side of the main brake line;

said control system comprising:

an accumulator for storing hydraulic pressure installed in the main brake line between the master cylinder and the wheel cylinder.

8. A vehicle brake control system used for anti-skid control or traction control, in combination with a brake system as claimed in claim 7, said control system further comprising:

a switching valve for switching between a non-constricted line and a constricted line, or a restrictor, positioned in the main brake line between the master cylinder and the wheel cylinder;

wherein said accumulator is installed in the main brake line between the inlet valve and the switching valve or restrictor.

9. A vehicle brake control system as claimed in claim 7 or claim 8, wherein the accumulator is of an extremely small capacity which varies the brake pressure of the wheel cylinder by at most a few atmospheres.

* * * * *